United States Patent [19]

Yamamoto et al.

[11] Patent Number: 4,829,945

[45] Date of Patent: May 16, 1989

[54] EXHAUST TIMING CONTROL DEVICE FOR TWO-CYCLE ENGINES

[75] Inventors: Hitoshi Yamamoto; Masayuki Toriyama; Kazumi Shibata, all of Saitama, Japan

[73] Assignee: Honda Giken Kogyo Kabushiki Kaisha, Tokyo, Japan

[21] Appl. No.: 67,066

[22] Filed: Jun. 26, 1987

[30] Foreign Application Priority Data

Jun. 26, 1986 [JP] Japan ................................ 61-150514
Sep. 10, 1986 [JP] Japan ................................ 61-213508

[51] Int. Cl.$^4$ ............................................. F02B 75/02
[52] U.S. Cl. ................................ 123/65 PE; 123/323; 60/314
[58] Field of Search ............ 123/65 PE, 65 V, 73 SP, 123/65 P, 323; 60/312, 314

[56] References Cited

U.S. PATENT DOCUMENTS

| | | | |
|---|---|---|---|
| 4,121,552 | 10/1978 | Mithuo | 123/65 PE |
| 4,237,831 | 12/1980 | Noguchi et al. | 123/65 A |
| 4,333,431 | 6/1982 | Iio | 123/323 |
| 4,341,188 | 7/1982 | Nerstrom | 123/324 |
| 4,388,894 | 6/1983 | Tanaka | 123/65 PE |
| 4,399,788 | 8/1983 | Bostelmann | 123/323 |
| 4,516,540 | 5/1985 | Nerstrom | 123/65 PE |
| 4,541,371 | 9/1985 | Kageyama | 123/65 PE |
| 4,621,596 | 11/1986 | Uchinishi | 123/65 PE |
| 4,622,928 | 11/1986 | Uchinishi | 123/65 PE |
| 4,672,925 | 6/1987 | Miyata et al. | 123/65 V |
| 4,706,617 | 11/1987 | Asai et al. | 123/65 PE |

FOREIGN PATENT DOCUMENTS

| | | |
|---|---|---|
| 51-39112 | 3/1976 | Japan . |
| 52-132916 | 10/1977 | Japan . |
| 54-158514 | 12/1979 | Japan . |
| 57-62917 | 4/1982 | Japan . |
| 57-105511 | 7/1982 | Japan . |
| 58-7059 | 2/1983 | Japan . |
| 58-7060 | 2/1983 | Japan . |
| 59-7008 | 2/1984 | Japan . |
| 60-2702 | 9/1985 | Japan . |
| 60-200779 | 9/1985 | Japan . |

Primary Examiner—David A. Okonsky
Attorney, Agent, or Firm—Lyon & Lyon

[57] ABSTRACT

An apparatus for controlling the exhaust timing of a two-cycle engine. A control valve is provided for adjusting the position of the top of the control port in the two-cycle engine as a function of the engine speed. A central processing unit receives a signal from an engine speed detector indicating the engine's operating speed. Based upon a control map, the central processing unit initiates action to adjust the position of the control valve.

12 Claims, 6 Drawing Sheets

EXHAUST TIMING CONTROL DEVICE FOR TWO-CYCLE ENGINES

FIELD OF THE INVENTION

The field of the present invention is timing mechanisms for the exhaust ports of two-cycle engines.

BACKGROUND OF THE INVENTION

Two-cycle engines, such as those used in vehicles, are generally designed to operate in one of two distinct engine speed, or revolutions per minute (RPM), regions. Thus, the prior art engine may be designed to operate in a low-engine-speed region or a high-engine-speed region. A prior art engine designed to operate in a low-engine-speed region has a peak power output only in this low-engine-speed region. Likewise, a prior art engine designed to operate in a high-engine-speed region has peak power output only in this high-engine-speed region. Thus, a prior art engine does not have a peak power output at both a low engine speed and at a high engine speed.

In contrast, the present invention raises the power output of a two-cycle engine at the low and middle engine-speed regions, and maintains a high peak power output at the high-engine-speed region. Thus, the present invention allows a two-cycle engine to operate at relatively high power outputs at all three of the low, middle and high engine speed regions.

One attempt at optimizing the performance of a two-cycle engine at different operating speeds involves adjusting the top of the opening of the exhaust port of the two-cycle engine between two predetermined positions, as desired by the operator. Thus, FIG. 1 of U.S. Pat. No. 4,516,540 shows a movable plate with an arc-like edge. In operation, the arc-like edge may be positioned to adjust the top of the exhaust port between either one of two distinct positions. However, such attempts to optimize the performance of a two-cycle engine ignore the fact that in a low-engine-speed region, while the compression ratio and the torque of the engine are very sensitive to the position of the top of the exhaust port, the extent to which the combustion products are exhausted and the fresh air-fuel mixture is introduced into the engine's combustion chamber are also very sensitive to the position of the top of the exhaust port.

That is, if the top of the exhaust port in a two-cycle engine is lowered in order to delay the exhaust timing, then the start of the compression stroke is accelerated to the same extent that the start of the exhaust stoke is delayed. This thereby increases the compression and the torque of the engine at low engine speeds. At the same time, the exchange rate of the fresh air-fuel mixture is lowered by lowering the top of the exhaust port. This has the effect of causing irregular combustion in the low-engine-speed region. Therefore, the desired result of optimizing the engine performance in the low-engine-speed region is not accomplished.

In an attempt to overcome the problems associated with an exhaust port opening that may be set at only one of two positions, the inertial mass of the flywheel of some previous two-cycle engines has been increased. However, this increase in the inertial mass of the flywheel has a tendency to decrease the responsiveness of the engine. Thus, the desired result of increased engine performance in a variety of engine operating speeds again is not attained.

SUMMARY OF THE INVENTION

The present invention is directed to a device for varying the exhaust timing of a two-cycle engine as a function of the engine's speed. The present invention is further directed to an exhaust timing control device which permits two-cycle engines to operate with a relatively high power output in the low, medium, and high engine-speed ranges.

Other and further objects and advantages will appear hereinafter.

DETAILED DESCRIPTION OF THE PREFERRED EMBODIMENT

A preferred embodiment of the present invention is disclosed. It will be understood by one skilled in the art that other embodiments of the present invention are also possible and are meant to be included within the scope of the appended claims.

Figure 1:
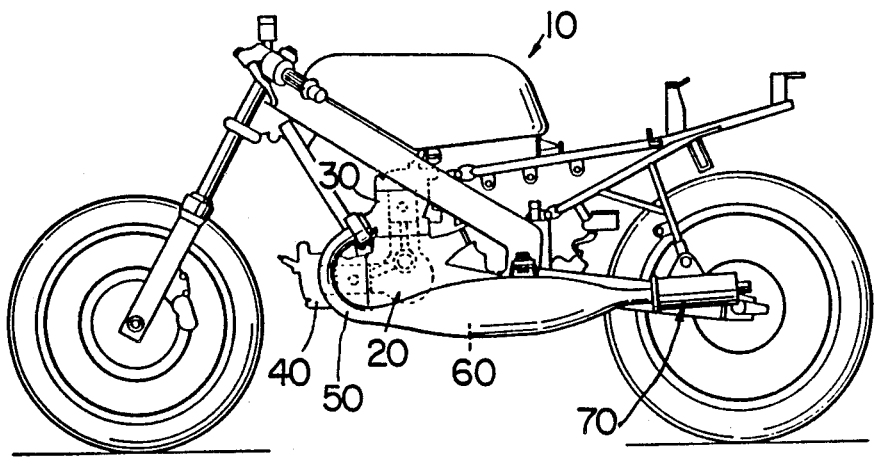
FIG. 1 is a side view of a motorcycle with an engine according to one embodiment of the present invention.

Referring now to FIG. 1, there is shown a motorcycle 10 with a two-cycle engine 20 according to one embodiment of the present invention. The two-cycle engine 20 may be a V-type engine with a first cylinder block 30 and a second cylinder block 40. Connected to the two-cycle engine 20 is an exhaust pipe 50. The exhaust pipe 50 contains an expansion chamber 60. A muffler 70 is connected to the end of the exhaust pipe 50 which exhausts the fumes into the atmosphere.

Figure 2:
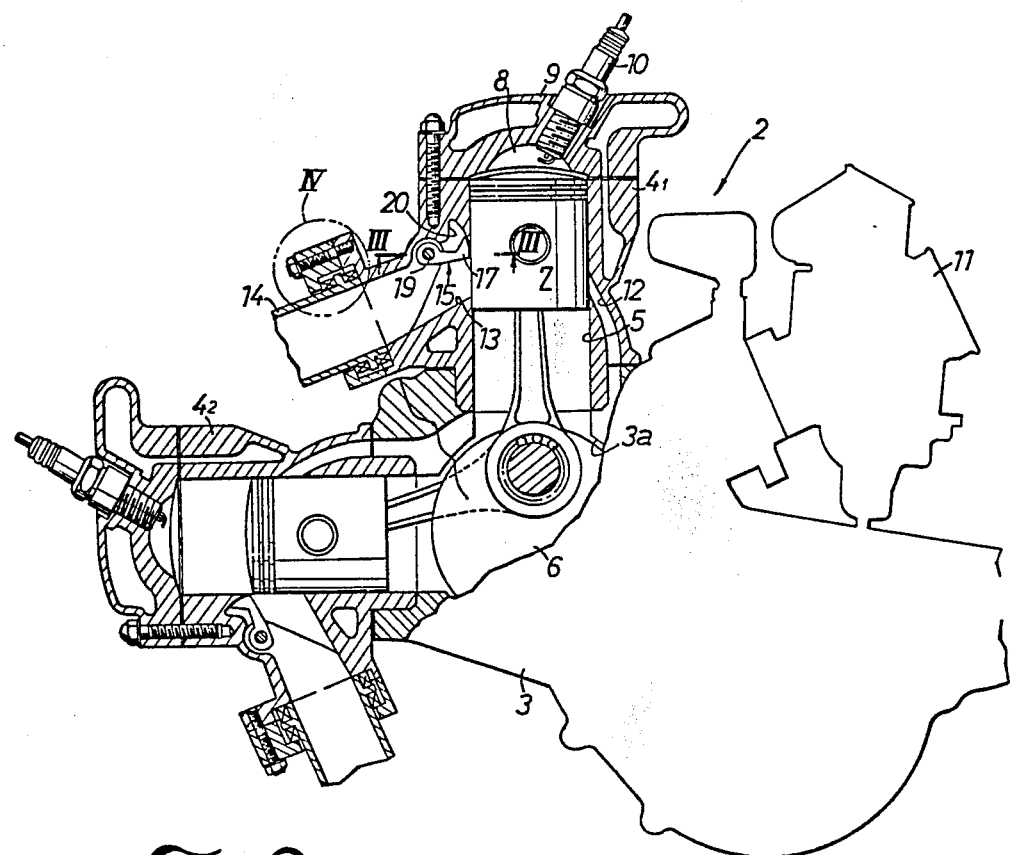
FIG. 2 is a cross-sectional side view of a portion of a two-cycle engine according to one embodiment of the present invention.

Turning to FIG. 2, the V-type two-cycle engine 20 has the first cylinder block 30 projecting from a crankcase 80 toward the upper portion of the motorcycle 10, and the second cylinder block 40 projecting from the crankcase 80 toward the forward portion of the motorcycle 10.

In a cylinder bore 90 of the first cylinder block 30 is a slidably-fitted piston 100. As is known in the art, the piston 100 is connected to a connecting rod 110, which connecting rod 110 is connected to a crankshaft 120. The crankshaft 120 is supported on the crankcase 80. A cylinder head 130 is fastened over the upper end of the first cylinder block 30 in such a manner as to define a combustion chamber 140 between the cylinder head 130 and the upper surface of the piston 100. In the cylinder head 130 is threadably-fastened an ignition plug 150 in such a manner that the ignition plug 150 presents an electrode in the combustion chamber 140.

A carburetor 160 is connected to a crankcase 80 in such a manner as to communicate with an inner crank chamber 170. In operation, an air-fuel mixture is supplied from the carburetor 160 to the inner crank chamber 170 when the piston 100 rises as a result of the turning of the crankshaft 120.

A transfer port 180 opens into the inner wall of the cylinder bore 90. The transfer port 180 communicates with the inner crank chamber 170. Also opening into the inner wall of the cylinder bore 90 is an exhaust port 190. The exhaust port 190 communicates with the exhaust pipe 50. As is known in the art, the transfer port 180 and the exhaust port 190 are opened and closed by the peripheral wall of the piston 100 as the piston 100 reciprocates during operation of the engine 10. That is, during the falling stroke of the piston 100, the top of the piston 100 passes down past the upper edge of the exhaust port 190 such that the exhaust port 190 communicates with the combustion chamber 140. In this manner the exhaust port 190 is opened and combustion gas from the combustion chamber 140 is exhausted through the exhaust port 190, the exhaust pipe 50, and the muffler 70. As the piston 100 continues downward in its falling stroke, the transfer port 180 is opened and the air-fuel mixture in the inner crank chamber 170 is delivered though the transfer port 180 into the combustion chamber 140. Thus, a transfer of the exhaust gases out of the combustion chamber 140 and the airfuel mixture into the combustion chamber 140 is affected.

During the rising stroke of the piston 100, the top of the piston 100 moves past the opening of the transfer port 180, the transfer port 180 is closed by the piston 100 and transfer is terminated. After the closing of the transfer port 180, the piston 100 continues its rise in the cylinder bore 90 and closes the exhaust port 190. Thus, the position of the upper edge of the opening of the exhaust port 190 into the cylinder bore 90 determines the timing of the opening and closing of the exhaust port 190 as a function of reciprocation of the piston 100. In this manner, the relative length of the transfer period with respect to the length of time of a single reciprocation of the piston 100 is determined.

As will be apparent to one skilled in the art, the structure of the second cylinder block 00 is essentially the same as the structure of the first cylinder block 30.

Figure 3:
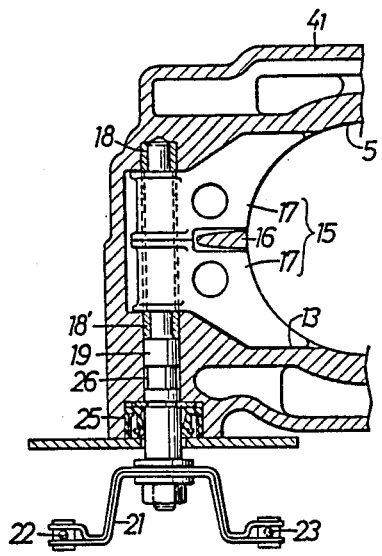
FIG. 3 in an enlarged cross-sectional view taken along line III—III of FIG. 2.

In one embodiment of the present invention, a control valve 200 is provided in the exhaust port 190 in order to control the transfer period of the engine 20. As shown in FIG. 3, the control valve 200 is comprised of a pair of flaps 210, 210, which flaps 210, 210 are arranged on either side of a reinforced wall 220. The reinforced Wall 220 connects the upper and lower walls of the cylinder bore 90 at the center of the exhaust port 190 where the exhaust port 190 opens into the cylinder bore 90. The flaps 210, 210 are connected to a valve shaft 240. The valve shaft 240 is rotatably supported on the first cylinder block 30 through bushings 230, 230. The ends of the flaps 210, 210 which are closest to the interior of the cylinder bore 90 form an arc which continues the inner periphery of the cylinder bore 90.

As shown in FIG. 2, the control valve 200 may be rotated about the axis of the valve shaft 240 such that in a lower, fully closed position the control valve 200 covers a portion of the top of the exhaust port 190 where the exhaust port 190 opens into the cylinder bore 90. In a fully open position, the control valve 200 is rotated about the axis of the valve shaft 240 such that the control valve 200 is retracted into an upper recess 250 of the first cylinder block 30. In this manner, a maximum opening of the exhaust port 190 into the cylinder bore 90 is accomplished. In addition to the fully opened position and the fully closed position, the control valve 200 may be situated in any number of a plurality of positions in-between. In this manner, the location of the upper end of the exhaust port 190 where the exhaust port 190 opens into the cylinder bore 90 may be varied between a fully open and a fully closed position. Thus, the timing of the opening and closing of the exhaust port 190 during the reciprocation of the piston 100 in operation of the engine 20 may be accomplished.

As shown in FIG. 3, on an outer end of the valve shaft 240 is a fixed an actuating lever 260. On one side of the actuating lever 260 a valve opening wire 270 is affixed. On the other side of the actuating lever 260 a valve closing wire 280 is affixed. The valve opening wire 270 and the valve closing wire 280 are connected to a servomotor 290 (shown in FIG. 5). The servomotor 290 is capable of rotating in a forward direction and in a reverse direction. Thus, by rotating the servomotor 290 in one direction, the valve opening wire 270 will cause the actuating lever 260 and the valve shaft 240 to rotate in such a manner that the control valve 200 is opened. By rotating the servomotor 290 in the opposite direction, the valve closing wire 280 will cause the actuating lever 260 and the valve shaft 240 to rotate in such a manner that the control valve 200 is closed.

Where the valve shaft 240 projects from the first cylinder block 30, an oil seal 300 is placed around the valve shaft 240 in the first cylinder block 30. An annular carbon sump 310 is formed at the surface of the valve shaft 240 between the oil seal 300 and the bushing 230, which bushing 230 lies closest to the oil seal 300.

Figure 4:
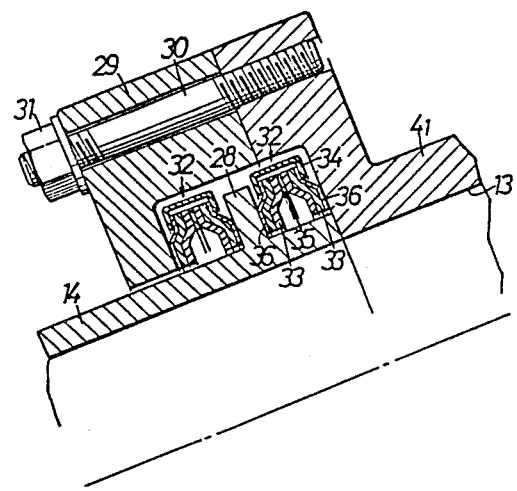
FIG. 4 is an enlarged view of a portion of the engine found in circle IV of FIG. 2.

Turning to FIG. 4, the mounting of the exhaust pipe 50 on the first cylinder block 30 is shown. A mounting ring 320 is held in place against the first cylinder block 30 by means of a stud bolt 330 and a nut 340. A mounting flange 345 projects from the outer surface of the front end of the exhaust pipe 50 in such a manner that the exhaust pipe 50 may be held in place against the exhaust port 190 when the mounting flange 345 is placed between the first cylinder block 30 and the mounting ring 320 a the outer opening of the exhaust port 190. A seal member 350 is placed between the first cylinder block 30 and the mounting flange 345. A second seal member 350 is placed between the mounting flange 345 and the mounting ring 320. In such a manner, the exhaust pipe 50 is fastened to the first cylinder block 30. Each of the seal members 350 has a first pair of dish-like springs 360, 360 facing each other, as shown in FIG. 4. Between the first springs 360, 360 is first seal plate 370. First seal plate 370 is of a copper plated material. A second pair of springs 375, 375 lie on the outside of the first springs 360, 360. On the outside of the second springs 375, 375 are second seal plates 380, 380. The second seal plates 380, 380 are made of a copper plated material. On the outer radius of the seal member 350, is a connecting ring 390. The connecting ring 390 overlaps a portion of the second seal plates 380, 38,, and in this manner holds the various components of the seal member 350 together. Thus, a seal member 350 capable of preventing a leakage of exhaust gas is disclosed.

Figure 5:
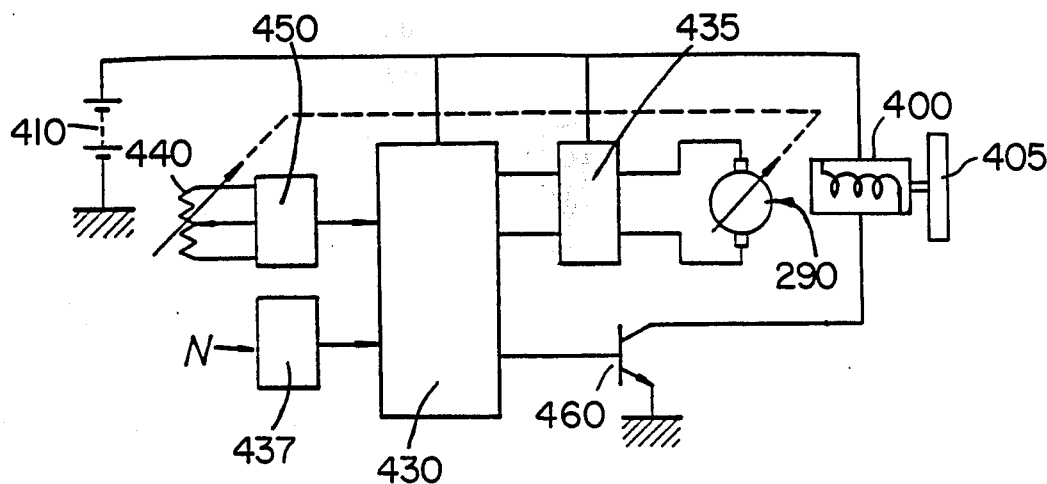
FIG. 5 is a diagram showing an electrical circuit of a control device according to one embodiment of the present invention.

Turning to FIG. 5, a diagram showing an electrical circuit of a control device is shown. A servomotor 290 is operatively connected to the control valve 200 for adjusting the position of the control valve 200. In this manner, the position of the top of the exhaust port 190 where the exhaust port 190 enters the cylinder bore 90 may be adjusted. A solenoid 400 is operatively connected a lubrication oil pump 405 for adjusting the flow from the lubrication oil pump of the two-cycle engine 20. A power supply 410 is connected on one side to ground and on the other side to a central processing unit 430, a driver circuit 435, and the solenoid 400. The central processing unit 430 receives input from an engine speed detector 437. The engine speed detector 437 may be a tachometer or other means of detecting the speed in number of revolutions per unit time of the two-cycle engine 20. Thus, the engine speed detector 437 is shown with an input "N" representing the speed in number of revolutions per unit time of the two-cycle engine 20.

A potentiometer 440 is operatively connected to the servomotor 290. Thus, as the servomotor 990 moves to various operating positions, the potentiometer 440 moves in sympathy with the servomotor 290. In this manner, the output of the potentiometer 440 indicates the position of the servomotor 290, and therefore indicates the position of the control valve 200 shown in FIG. 2. The output of the potentiometer 440 is input to an analog-to-digital converter 450. The analog-to-digital converter 450 converts the analog output of the potentiometer 440 to a digital signal representing the position of the servomotor 290, and thus, the position of the control valve 200. The output of the analog-to-digital converter 450 is input to the central processing unit 430.

One output of the central processing unit 430 forms the input to a transistor 460. The transistor 460 shown in FIG. 5 is an NPN transistor, although as is well-know in the art any equivalent device such as a PNP transistor may be used, according to the requirements of the specific circuit characteristics. One side of the transistor 460 is connected to ground, the other side of the transistor 460 is connected through the solenoid 400 to the power supply 410. In this manner, the transistor 460 controls the operation of the solenoid 400 depending upon the output of the central processing unit 430. Thus, the output of the central processing unit 430 controls the flow from the lubrication oil pump (not shown), as discussed above.

Output from the central processing unit 430 is also provided to a driver circuit 435. The driver circuit 435 drives the servomotor 290 according to the output of the central processing unit 430. Thus, according to the output of the central processing unit 430, the position of the servomotor 290 may be adjusted and the position of the control valve 200 may thereby be adjusted.

While this description has disclosed the use of a servomotor for controlling the position of the control valve, it will be apparent to one skilled in the art that any suitable activating means, such as a hydraulic or an air pressure system, may also be employed. It will also be apparent to one skilled in the art that any suitable position indicating means for indicating the position of the control valve may be employed in place of the potentiometer operatively connected to the servometer, as disclosed herein.

The central processing unit 430 contains a control map for adjusting the position of the control valve 200 according to the engine speed of the two-cycle engine 20. The central processing unit 430 also contains a solenoid control map for adjusting the flow from the lubrication oil pump according to the engine speed of the engine 20. According to the control valve control map, the relationship between the position of the control valve 200 and the engine speed of the engine 200 is fixed. Likewise, according to the solenoid control mp, the relationship between the flow of the lubrication oil pump and the engine speed of the two-cycle engine 20 is fixed.

Figure 6:
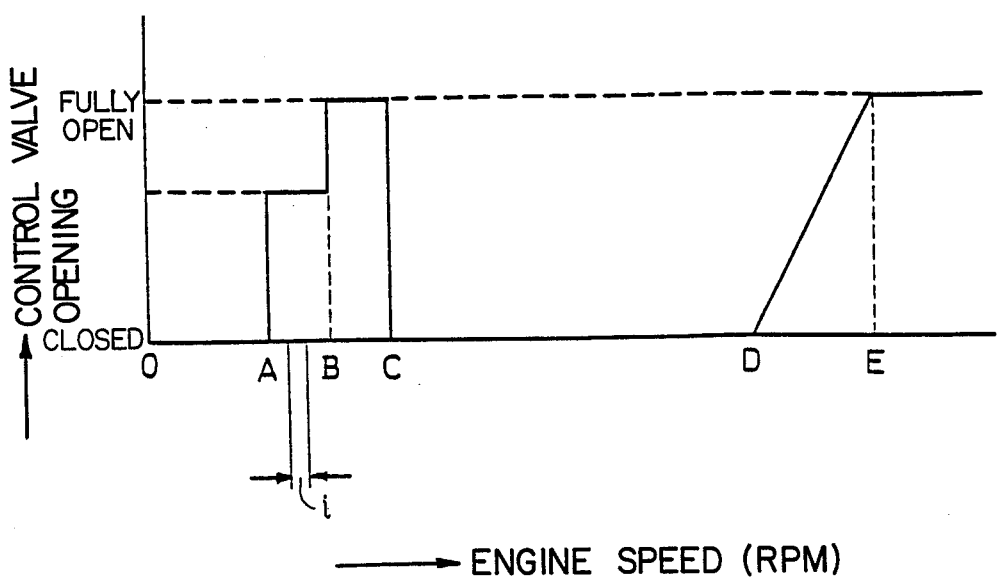
FIG. 6 is a graph showing the position of a control valve as a function of engine speed for one embodiment of the present invention.

FIG. 6 shows the relationship between the position of the control valve 200 as a function of the engine speed of the two-cycle engine 20. Engine speed A is at approximately 1,000 revolutions per minute. The two-cycle engine 20 does not normally operate at an engine speed below the engine speed A. In the engine speed region below engine speed A, the control valve 200 is closed.

Engine speed B is at approximately 1,750 revolutions per minute. In the engine speed region between engine speeds A and B, is an idling region, i. The engine speed region between engines speeds A and B is called a very-low-engine-speed region. In the engine speed region between engine speeds A and B, the control valve 200 is opened to an intermediate position, as shown in FIG. 6.

Engine speed C is at approximately 3,000 revolutions per minute. At an engine speed region between engine speeds B and C, the control valve 200 is fully open. The engine speed region between engine speeds B and C is called a low-engine-speed region.

Engine speed D is at approximately 6,000 revolutions per minute. The engine speed region between engine speeds C and D is called a middle-engine-speed region. At an engine speed between engine speeds C and D, the control valve 200 is fully closed.

Engine speed E is at approximately 10,000 revolutions per minute. The engine-speed region between engines speeds D and E is called a high-engine-speed region. At an engine speed within the region between engine speeds D and E, the opening of control valve 200 is proportionate to the engine speed. Thus, at an engine speed D, the control valve 200 is fully closed while at an engine speed E the control valve 200 is fully opened. At an engine speed above engine speed E, the control valve 200 is fully open.

Figure 7:
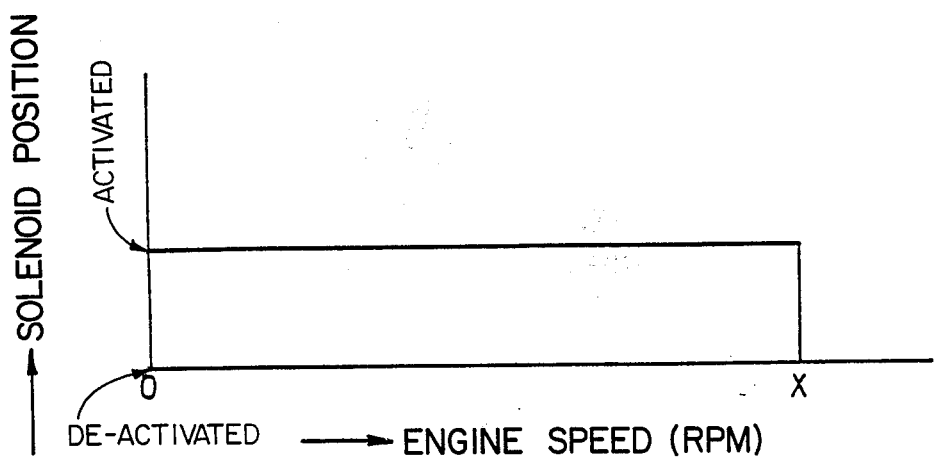
FIG. 7 is a graph showing the operating condition of a solenoid as a function of engine speed for adjusting the flow from a lubrication oil pump according to one embodiment of the present invention.

FIG. 7 shows the position of the solenoid 400 as a function of the engine speed of the two-cycle engine 20. As shown in FIG. 7, when the engine speed of the two-cycle engine 20 is below a predetermined speed X, the solenoid 400 is in an excited position. In such an excited position, the solenoid 400 operates the lubrication oil pump such that the flow from the lubrication oil pump is at a minimum. When the engine speed of the two-cycle engine 20 is above the predetermined speed X, the solenoid 400 is in an unexcited position and the flow from the lubrication oil pump is increased from the flow existing when the engine speed of the two-cycle engine 20 is below the predetermined speed X.

Figure 8:
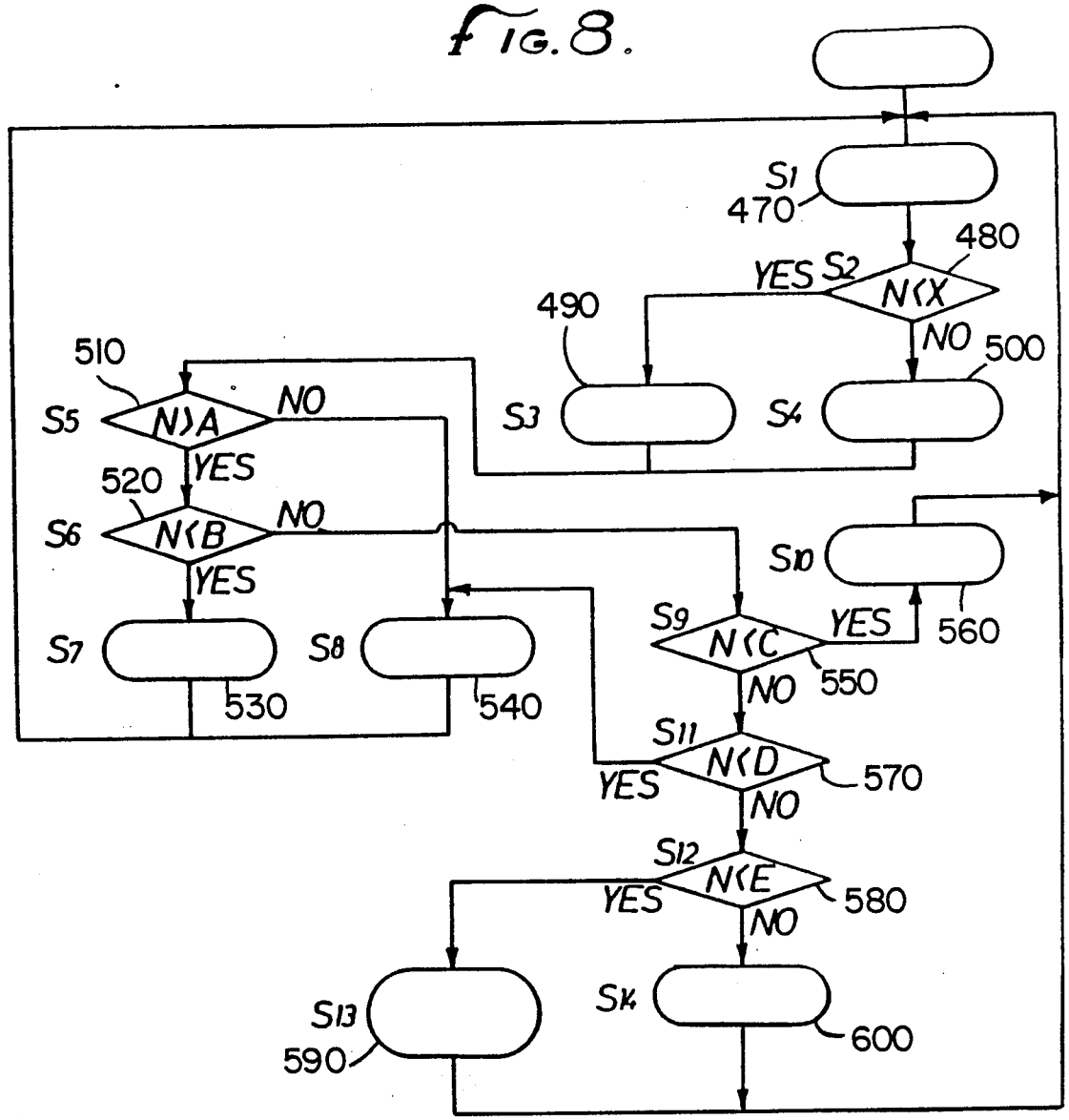
FIG. 8 is a decision flow-chart for a central processing unit of a control device of one embodiment of the present invention.

FIG. 8 shows a decision chart for the central processing unit 430. In a first step 470, the central processing unit 430 reads the engine speed N. In a second step 480, the central processing unit 430 determines whether the engine speed N is less than the predetermined speed X. If the engine speed N is less than the predetermined speed X, then a third step 490 is performed. In the third step 490, the flow of lubrication oil from the lubrication oil pump is decreased. If the third step 490 is performed, the central processing unit 430 then moves on to a fifth step 510.

If, in the second step 480, the engine speed N is not less than the predetermined speed X, then a fourth step 500 is performed. In the fourth step 500 the flow of lubrication oil from the lubrication oil pump is increased. If the fourth step 500 is performed, than the central processing unit 430 moves on to a fifth step 510.

In the fifth step 510 the central processing unit 430 determines whether the engine speed N is greater than the speed A. If the engine speed N is greater than the speed A, then the central processing unit 430 performs a sixth step 520.

In the sixth step 520, the central processing unit 430 determines whether the engine speed N is less than the speed B. If the engine speed N is less than the speed B, then the central processing unit 430 performs a seventh step 530.

In the seventh step 530 the control valve 200 is adjusted to a middle opening position. If the central processing unit 430 performs the seventh step 530, the central processing unit 430 next performs the first step 470.

If in the fifth step 510, the central processing unit 430 determines that the engine speed N is not greater than the speed A, then the central processing unit 430 performs an eighth step 540. In the eighth step 540, the control valve 200 is adjusted to a fully closed position. If the central processing unit 430 performs the eighth step 540, the central processing unit 430 next performs the first step 470.

If in the sixth step 520, the engine speed N is not less than speed B, the central processing unit 430 next performs a ninth step 550. In the ninth step 550, the central processing unit 430 determines whether the engine speed N is less than speed C. If the engine speed N is less than the speed C, then the central processing unit 430 performs a tenth step 560.

In the tenth step 560, the control valve 200 is adjusted to a fully open position. If the central processing unit 430 performs the tenth step 560, the central processing unit 430 then next performs the first step 470.

If in the ninth step 550, the central processing unit 430 determines that the engine speed N is not less than the speed C, then the central processing unit 430 performs an eleventh step 570. In the eleventh step 570, the central processing unit 430 determines whether the engine speed N is less than speed D. If the engine speed N is less than the speed D, then the central processing unit 430 performs the eighth step 540. As discussed above, in the eighth step 540 the control valve 200 is adjusted to a fully closed position. As also discussed above, if the central processing unit performs the eighth step 540, it then next performs the first step 470.

If in the eleventh step 570 the central processing unit 430 determines that the engine speed N is not less than the speed D, then the central processing unit 430 performs a twelfth step 580. In the twelfth step 580, the central processing unit 430 determines whether the engine speed N is less than the speed E. If the engine speed N is less than the speed E, then the central processing unit 430 performs a thirteenth step 590.

In the thirteenth step 590, the control valve 200 is adjusted so that the position of the control valve 200 is proportional to the increment of the engine speed N above speed D. Thus, at an engine speed N that is equal to speed D, the control valve 200 is in a fully closed position. As the engine speed N increases from speed D, the control valve 200 opens in a manner proportional to the increase in the engine speed N above speed D, until the control valve 200 is fully open when the engine speed N is equal to speed E. If the central processing unit 430 performs the thirteenth step 590, the central processing unit 430 next performs the first step 470.

If in the twelfth step 580, the central processing unit 430 determines that the engine speed N is not less than the speed E, then the central processing unit 430 performs a fourteenth step 600. In the fourteenth step 600, the control valve 200 is adjusted to a fully open position. If the central processing unit 430 performs the fourteenth step 600, the central processing unit 430 next performs the first step 470.

In such a manner, a control map in the central processing unit 430 for adjusting the position of the control valve 200 and a control map in the central processing unit 430 for adjusting the flow from a lubrication oil pump are defined.

In operation, as the piston 100 reciprocates in the cylinder bore 90, the piston 100 passes up and down past the opening of the exhaust port 190 in the cylinder bore 90. In this manner the exhaust port 190 is opened and closed and exhaust passes from the combustion chamber 140 through the exhaust port 190 into the exhaust pipe 50 in an interrupted stream that is function of the engine speed of the two-cycle engine 20. The exhaust flows through the exhaust pipe 50 into the expansion chamber 60 and through the muffler 70 into the atmosphere. The expansion chamber 60 is so formed in cooperation with the exhaust pipe 50 that at various engines speeds, pressure waves are generated in the exhaust pipe 50. Thus, the expansion chamber 60 is so formed that when the engine speed N of the two-cycle engine 20 reaches the speed E, which may be approximately 10,000 revolutions per minute, a primary regular pressure wave generated in the exhaust pipe 50 due to the exhaust of the previous engine stroke will reach the exhaust port 190 near the termination of the transfer of the engine 20. In this manner, at the maximum engine speed of the engine 20, the blowing through of the air-fuel mixture from the combustion chamber 140 through the exhaust port 190 is minimized because of the existence of the primary regular pressure wave in the exhaust pipe 50.

In addition to the primary regular pressure wave generated at the approximate maximum engine speed, speed E, of the two-cycle engine 20, various other pressure waves are generated in the exhaust pipe 50 at speeds other than the approximate maximum engine speed, speed E. By adjusting the position of the control valve 200 as a function of the engine speed of the two-cycle engine 20, various pressure waves may be utilized to minimize the flow-through of the air-fuel mixture through the combustion chamber 40 near the termination of the transfer.

As shown in FIG. 6, when tee two-cycle engine 20 is operating in the low-engine-speed region between the speeds A and B, the control valve 220 is adjusted so that the opening period of the exhaust port 190 as a function of the reciprocation of the piston 100 is somewhat larger than the opening period of the exhaust port 190 when the control valve 200 is adjusted to the fully closed position. Thus, the volume of air-fuel mixture which blows through the combustion chamber 140 into the exhaust port 190 is increased above that which would flow through were the control valve 200 adjusted to a fully closed position. However, in this condition the opening angle of the throttle valve in the carburetor 160 is necessarily increased to correct for a reduction in output from the carburetor 160. Thus, the transfer effect is increased, an irregular explosion in the combustion chamber 140 does not occur, and the operation of the two-cycle engine 20 is stabilized in the very low-engine-speed condition.

When the engine speed N is in a region between the speed B and the speed C, the control valve 200 is in the fully opened position as shown in FIG. 6. While the two-cycle engine 20 is operating in the low-engine-speed region, a regular pressure wave generated in the exhaust pip 50 due to the exhaust of the preceding engine stroke occurs. This regular pressure wave is felt at the opening of the exhaust port 190 into the cylinder bore 90 at the end of the transfer period. Thus, the regular pressure wave acts to push back the air-fuel mixture and prevent the air-fuel mixture from passing through the combustion chamber 140 while the two-cycle engine 20 is operating in the low-engine-speed region. In this manner, the acceleration performance of the two-cycle engine 20 is improved during low-engine-speed operation.

When the engine speed of the engine 20 is in the middle-engine-speed region, which is between the speeds C and D, the control valve 200 is in the fully closed position. Thus, the opening period of the exhaust port 190 wit respect to the complete cycle of the engine 20 is minimized. In this manner, the air-fuel mixture blown through the combustion chamber 140 to the exhaust port 190 during the transfer is minimized.

When the engine speed of the two-cycle engine 20 is in the high-engine-speed region, which region is between the speeds D and E, the position of the control valve 200 is proportional to the difference between the engine speed N and the speed D. In this manner, complete transfer always occurs in the high-engine-speed region, and a high power output of the engine 20 is accomplished.

As discussed above, when the engine speed reaches the speed E, the control valve 200 is in the fully open condition. As discussed, at this engine speed, a primary regular pressure wave is felt at the opening of the exhaust port 190 into the cylinder bore 90 at approximately the same time as the end of the transfer.

Figure 9:
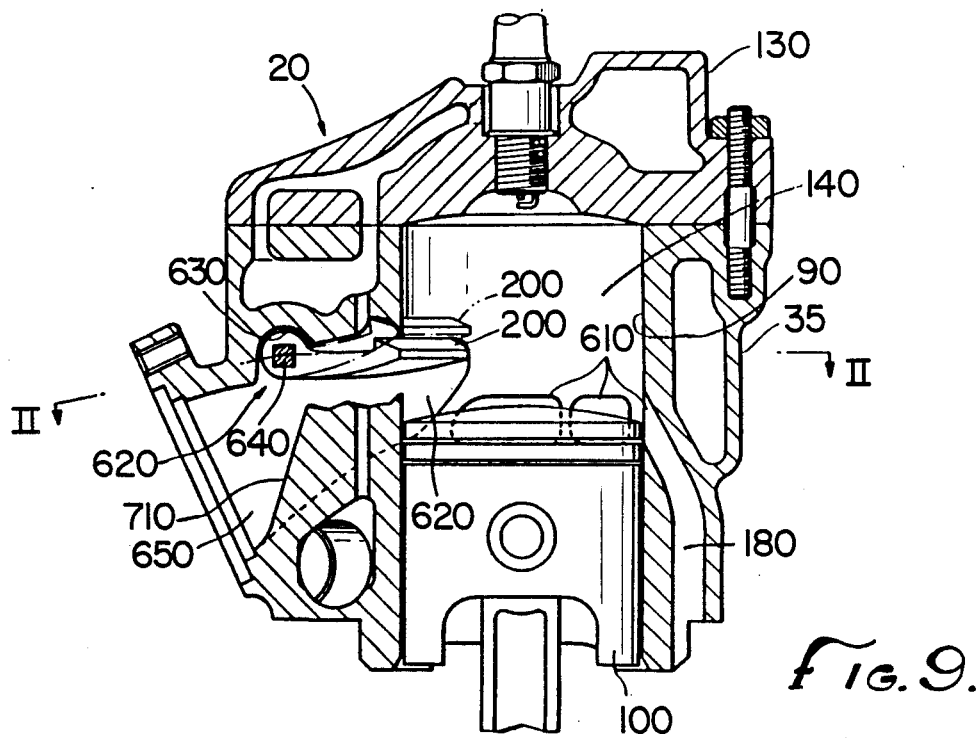
FIG. 9 is a cross-sectional view of a portion of a two-cycle engine according to a second embodiment of the present invention.

Turning now to FIG. 9, a cross-sectional view of a portion of a two-cycle engine according to a second embodiment of the present invention is shown. A two-cycle engine 20 is provided with a cylindrical cylinder block 35. The cylinder block 35 contains a cylinder bore 90. A cylinder head 130 is mounted on top of the cylinder block 35. A piston 100 is slidably-fitted within the cylinder bore 90. In this manner, a combustion chamber 140 is formed in the cylinder bore 90 between the top of the piston 100 and the bottom of the cylinder head 130. A plurality of transfer ports 180 open into the cylinder bore 90 at a plurality of transfer port openings 610. A single exhaust port 620 opens into the cylinder bore 90. In operation, the reciprocation of the piston 100 alternately opens and closes the transfer port openings 610 and the exhaust port 620 in such a manner that a transfer period, as discussed above, is defined.

An exhaust timing control device 620 is mounted in a recess 630 on shaft 640. The recess 630 is at the upper portion of the exhaust passage 650. The exhaust timing control device 620 contains a control valve 200. The control valve 200 is adapted to open and close an upper portion of the exhaust port 620.

Figure 10:
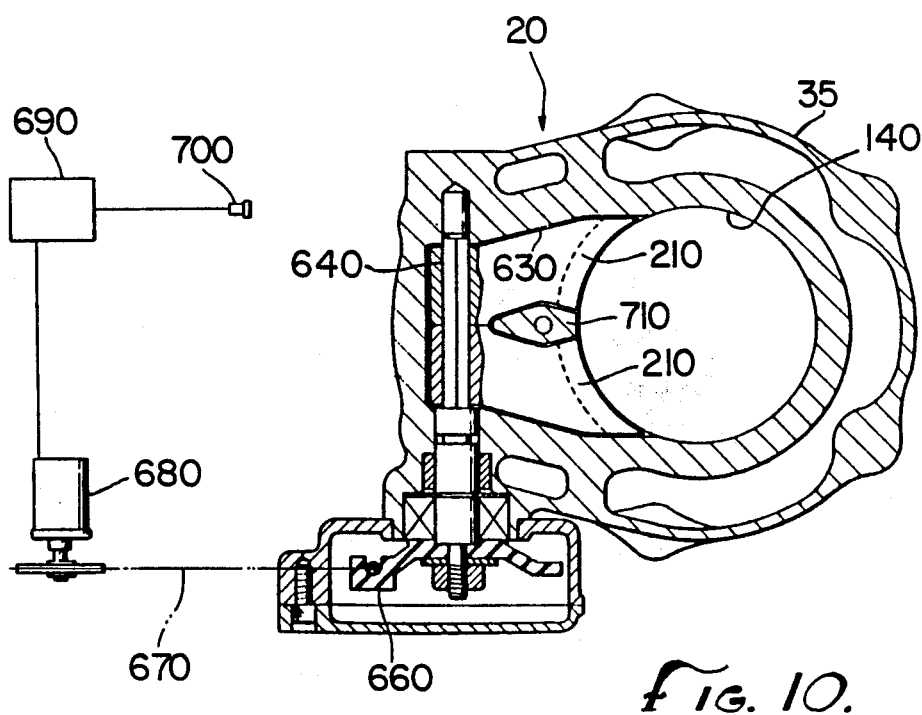
FIG. 10 is a cross-sectional view taken along X—X of FIG. 9.

Turning to FIG. 10, a two-cycle engine 20 contains a cylinder block 35. Shaft 640 is mounted in the upper wall of the exhaust passage 650. The shaft 640 is rotatably-mounted in the cylinder block 35. One end of the shaft 640 protrudes from the side of the cylinder block 35. On the protruding end of the shaft 640 is a wire drum 660. The wire drum 660 is mounted to the shaft 640 in such a manner that when the wire drum 660 turns the shaft 640 will rotate. The wire drum 660 is connected to a wire 670. The wire 670 is connected t both the wire drum 660 and an actuator 680. The actuator 680 may be, for example, a servomotor. The actuator 680 is connected to a control unit 690 in such a manner that the position of the actuator 680 may be controlled by the output of the control unit 690. The control unit 690 receives as an input the output of an engine speed detector 700.

As shown in FIG. 10, the control valve 200 is comprised of two flaps, 210. The flaps 210 are shaped at one end to conform to a continuation of the radius of the cylinder bore 90. the flaps 210 surround on two sides a rib 710. The rib 710 divides the exhaust port 620 and the exhaust passage 650 into two portions. The rib 710 is aligned with an axis that approximately parallels the axis of the cylinder bore 90. The flaps 210 are affixed to the shaft 640 in such a manner that the flaps 210 contact each other at the shaft 640. In such a manner, the control valve 200 is affixed to the shaft 640.

In operation, the engine speed detector 700 outputs the speed of the engine 20. The output of the engine speed detector 700 forms an input to the control unit 690. In such a manner, the control unit 690 controls the position of the actuator 680 and therefore the rotation of the shaft 640 and the position of the control valve 200 according to a predefined control map in response to the speed of the engine 20.

Figure 11:
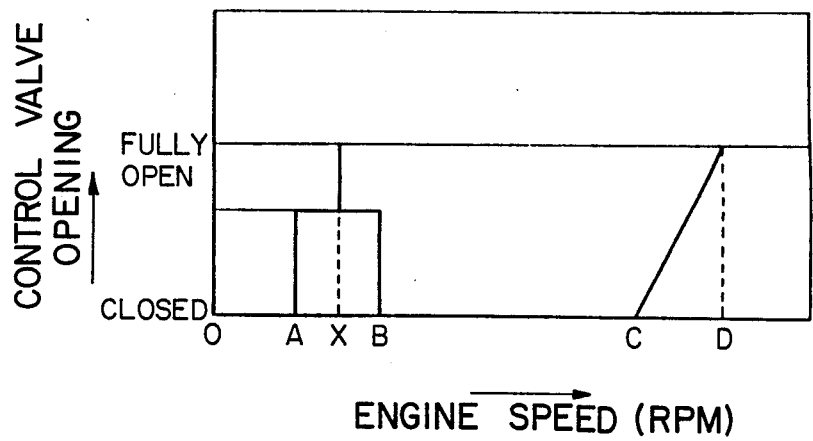
FIG. 11 is a graph showing the opening of a control valve as a function of the engine speed of a two-cycle engine according to a second embodiment of the present invention.

Turning to FIG. 11, a graph showing the opening of the control valve 200 as a function of the engine speed of the engine 20 is shown. As shown, when the engine speed is between 0 RPM and speed A, the control valve 200 is closed. The speed A may be a speed at approximately the lower limit of an idling region of the engine 20.

When the engine speed is between the speeds A and B, the control valve 200 is open to an opening approximately mid-way between fully open and closed. The speed range between the speed A and the speed B is a low-speed region, which region includes the idling region. As also shown, when the speed N of the engine 20 reaches a speed of X, the control valve 200 cycles once to a fully open position. In this manner, carbon which may have adhered to the control valve 200 is scraped off the control valve 200 against the inner surface of the recess 630. The speed X is set as close as possible to the idle speed of the engine 20.

When the engine speed is between the speed B and the speed C, the control valve 200 is in a fully closed position. The engine speed region between the speed B and the speed C defines a middle-engine-speed region.

When the speed of the engine 20 is between the speed C and the speed D, the control valve 200 is opened to a position that is proportional to the difference between the speed of the engine 20 and the speed C. Thus, at the speed C the control valve is fully closed, while at the speed D the control valve 200 is fully opened. The speed region between the speed C and the speed D is a high-engine-speed region.

At an engine speed greater than or equal to the speed D, the control valve 200 is in a fully opened position.

Figure 12:
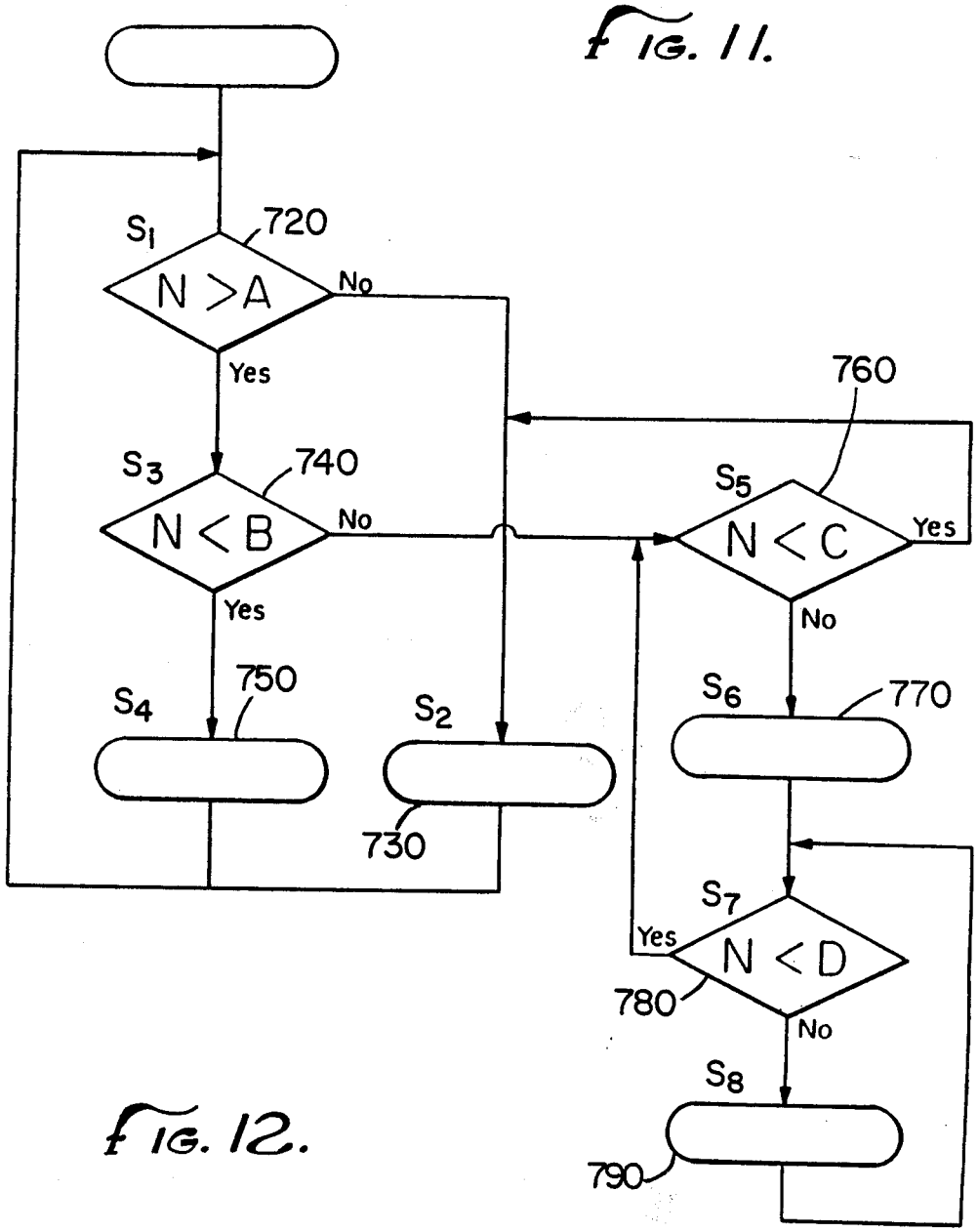
FIG. 12 is a decision flow-chart for operating a control valve according to a second embodiment of the present invention.

Turning now to FIG. 12, a decision flow-chart for operating a control valve according to a second embodiment of the present invention is shown. The decision flow-chart may be part of a map contained in the control unit 690 for controlling the control valve 200 according to the input to the control valve 690 from the engine speed detector 700.

As shown in FIG. 12, in a first step 720, it is determined whether the engine seed N is greater than the speed A. If the engine speed N is not greater than the speed A, then a second step 730 is performed.

In the second step 730, the control valve 200 is positioned into the fully closed position. If the second step 730 is performed, the first step 720 is then performed next.

If in the first step 720 it i determined that the engine speed N is greater than the speed A, then a third step 740 is performed. In the third step 740, the engine speed N is compared to the speed B. If in the third step 740 the engine speed N is less than the speed B, then a fourth step 750 is performed.

In the fourth step 550, the control valve 200 is positioned to a middle-open position between the fully opened and closed positions. If the fourth step 750 is performed, then the next step performed is the first step 720.

If in the third step 740 it is determined that the engine speed N is not less than the speed B, then a fifth step 760 is performed.. In the fifth step 760, the engine speed N is compared to the speed C. If in the fifth step 760 the engine speed N is less than the speed C, then the second step 730 is performed and the control valve 200 is positioned in the fully closed position. Again, if the second step 730 is performed, then the next step performed is the first step 720.

If in the fifth step 760 the engine speed N is not less than the speed C, then a sixth step 770 is performed. In the sixth step 770, the position of the control valve 200 is adjusted to be between the fully closed and fully opened positions and to be proportional to the difference between the engine speed N and the speed C. When the engine speed N is equal to the speed C, then the control valve 000 is in the closed position. When the engine speed N is equal to the speed D, the control valve 200 is in the fully opened position.

If the sixth step 770 is performed, then a seventh step 780 is performed next. In the seventh step 780, the engine speed N is compared to the speed D. If the engine speed N is less than the speed D, then the fifth step 760 is performed. If the engine speed N is not less than the speed D, then an eighth step 790 is performed.

In the eighth step 790, the control valve 200 is positioned in a fully opened position. If the eighth step 790 is performed, then the seventh step 780 is performed next.

In this manner a decision map for controlling the control valve 200 is defined. The decision map may be incorporated into the control unit 690 for controlling the control valve 200 as a function of the engine speed N as measured by the engine speed detector 700. The functioning of the second embodiment of the present invention will now be discussed in greater detail.

When the engine 20 is in an off condition, the control valve 200 is in fully closed position. After starting, the engine speed will pass into the low speed region, between the speeds A and B. While the engine speed N is in this low speed region, the control valve 200 is in a middle position, between the fully closed and fully opened positions. Also, as the engine speed passes the speed X, the control valve 200 reciprocates once up into the fully opened position in order to clean off any carbon that may have accumulated on the control valve 200. The speed X is between the speeds A and B.

The middle position of the control valve 200 is such that an optimum balance is obtained between the effects of the increased compression ratio and torque due to the delayed opening of the exhaust port 620 and the lower air-fuel exchange rate that occurs when the top of the exhaust port 620 is lowered. In this manner, the engine 20 can have an optimum power output and smooth operating characteristics at the low-engine-speed region.

In the region above the speed B, the torque of the engine 20 is not greatly affected by a change in the position of the control valve 200. In this middle-engine-speed region, the control valve 200 is positioned for optimum performance of the engine 20. Likewise, in an engine-speed region above the speed C, the position of the control valve 200 is proportional to the increment of engine speed above the speed C, for optimum performance of the engine 20.

Thus a plurality of exhaust timing control devices are disclosed. While embodiments and applications of this invention have been shown and described, it would be apparent to those skilled in the art that many more modifications are possible without departing form the inventive concepts herein. The invention, therefore, is not to be restricted except in the spirit of the appended claims.

What is claimed is:

1. An apparatus for adjusting the timing of the exhaust of a two-cycle engine, comprising:
    a control valve for adjusting the position of the top of the exhaust port in said two-cycle engine; and
    means for automatically adjusting said control valve as a function of the speed of said engine, wherein
    said control valve is in a closed position when said engine is off,
    said control valve is in a middle-open position between said closed position and a fully opened position when said engine speed is in a very-low-engine-speed region,
    said control valve is in a fully opened position when said engine speed is in a low-engine-speed region,
    said control valve is in a closed position when said engine speed is in a middle-engine-speed region,
    the position of said control valve is open from said fully closed position in an amount proportionate to the difference between said engine speed and the maximum speed of said middle-engine-speed region, when the engine is in a high-engine speed region, and
    said control valve is in a fully opened position when said engine speed is in a region above said high-engine-speed region.

2. The apparatus for adjusting the timing of the exhaust of a two-cycle engine of claim 1, wherein said means for automatically adjusting said control valve comprises:
   a central processing unit operatively connected to a servomotor for adjusting the position of said control valve.

3. The apparatus for adjusting the timing of the exhaust of a two-cycle engine of claim 2, in which said means for automatically adjusting said control valve further comprises:
   a potentiometer operatively connected to said servomotor for determining the position of said servomotor;
   an analog to digital converter operatively connected to said potentiometer for converting the output of said potentiometer to a digital signal, said analog to digital convertor being operatively connected to said central processing unit for inputing the position of said servomotor into said central processing unit;
   an engine speed detecting mean operatively connected to said central processing unit for inputting the engine speed of said engine into said central processing unit; and
   a driver circuit operatively connected to said central processing unit for driving said servomotor according to the output of said central processing unit.

4. An apparatus for adjusting the exhaust timing of a two-cycle engine, comprising:
   a control valve for adjusting the position of the top of an exhaust port in said two-cycle engine; and
   a central processing unit for adjusting the position of said control valve according to the speed of said engine, wherein said central processing unit contains a control map such that
   said control valve is in a closed position when said engine is off,
   said control valve is in a middle-open position between said closed position and a fully opened position when said engine speed is in a very-low-engine-speed region,
   said control valve is in a fully opened position when said engine speed is in a low-engine-speed region,
   said control valve is in a closed position when said engine speed is in a middle-engine-speed region,
   the position of said control valve is open from said fully closed position in an amount proportional to the difference between said engine speed and the maximum speed of said middle-engine-speed region, when said engine is in a high-engine-speed region, and
   said control valve is in a fully opened position when said engine speed is in a region above said high-engine-speed region.

5. The apparatus for adjusting the exhaust timing of a two-cycle engine of claim 4, further comprising:
   frequency detector means operatively connected to said central processing unit for inputting the speed of said engine into said central processing unit;
   a driver circuit operatively connected to said central processing unit for driving a servomotor according to the output of said central processing unit;
   a servomotor operatively connected to said driver circuit and to said control valve for controlling the position of said control valve according to the output of said central processing unit;
   a potentiometer operatively connected to said servomotor for determining the position of said servomotor; and
   an analog to digital converter operatively connected to said potentiometer and to said central processing unit for converting the output of said potentiometer to digital form for input into central processing unit.

6. The apparatus for adjusting the exhaust timing of a two-cycle engine of claim 5, further comprising:
   means for adjusting the engine lubricating oil flow from a lubrication oil pump operatively connected to the engine according to the engine speed of said engine.

7. The apparatus of claim 5 further comprising
   a solenoid connected to a lubrication oil pump, said solenoid linked to and controlled by an output from the central processing unit and thereby adjusting the flow of lubrication oil to the engine.

8. An apparatus for adjusting the timing of the exhaust of a two-cycle engine, comprising:
   a control valve for adjusting the position of the top of the exhaust port in said two-cycle engine; and
   means for automatically adjusting said control valve as a function of the speed of said engine, wherein
   said control valve is in a closed position when said engine is off;
   said control valve is in a middle-open position between said closed position and a fully opened position when said engine speed is in a low-engine-speed region,
   said control valve is in a closed position when said engine speed is in a middle-engine-speed region,
   the position of said control valve is open from said fully closed position in an amount proportional to the difference between said engine speed and the maximum speed of said middle-engine-speed region, when said engine is in a high-speed region, and
   said control valve is in an open position when said engine speed is in a region above said high-engine-speed region.

9. The apparatus of claim 8, in which said control valve reciprocates once from the middle position to the fully opened position each time the speed of said engine passes a specified engine speed in the low-engine-speed region.

10. An apparatus for adjusting the timing of the exhaust of a two-cycle engine having an exhaust pipe and an exhaust port, comprising:
   a control valve for adjusting the position of the top of the exhaust port in said two-cycle engine;
   actuating means operatively connected to said control valve for positioning said control valve;
   a central processing unit operatively connected to said actuating means for adjusting the position of said control valve;
   engine speed detecting means;
   actuating means linked to the engine speed detecting means for actuating the control valve into a fully opened position when the engine is operating in the low-engine-speed region, such that a regular pressure wave of higher order is generated in the exhaust pipe from the exhaust of a previous stroke and the regular pressure wave arrives at the exhaust port approximately at the end of the air-fuel scavenging gas transfer.

11. The apparatus of claim 10 further comprising an expansion chamber attached to said pipe such that at higher engine speed, a primary regular pressure wave generated in the exhaust pipe due to exhaust of a previous stroke arrives at the exhaust port approximately at the end of the air-fuel scavenging gas transfer.

12. An apparatus for adjusting the timing of the exhaust of a two-cycle engine having an exhaust pipe and an exhaust port, comprising:
- a control valve for adjusting the position of the top of the exhaust port in said two-cycle engine;
- actuating means operatively connected to said control valve for positioning said control valve;
- engine speed detecting means;
- actuating means linked to the engine speed detecting means for actuating the control valve into a fully opened position when the engine is operating in the low-engine-speed region, such that a regular pressure wave of higher order is generated in the exhaust pipe from the exhaust of a previous stroke and the regular pressure wave arrives at the exhaust port approximately at the end of the air-fuel scavenging gas transfer.

* * * * *